(No Model.)
S. KAUFFMAN.
WAGON BRAKE.
No. 408,015. Patented July 30, 1889.
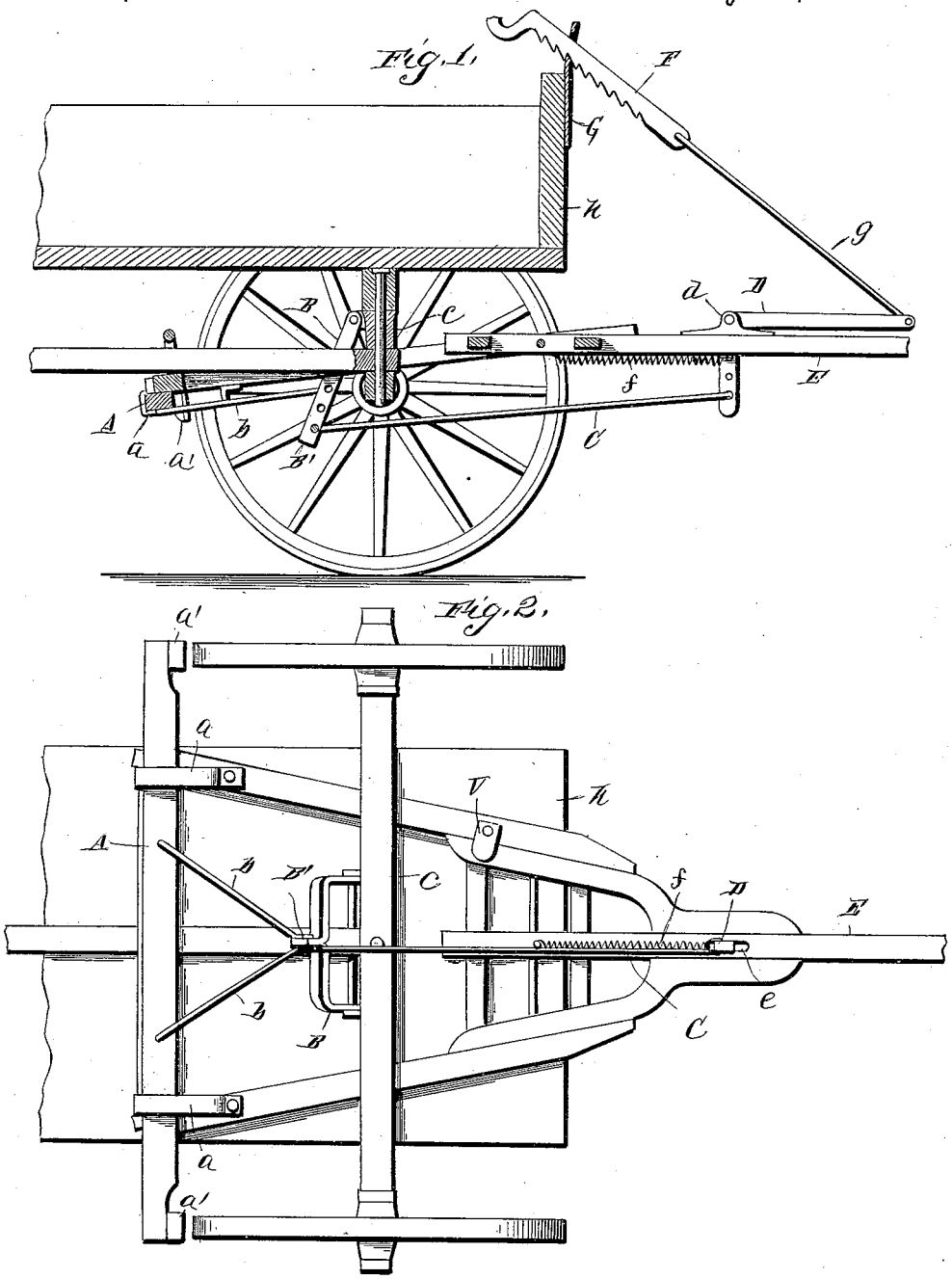
Witnesses
C. L. Taylor
Phill. Mass
Inventor
S. Kauffman
by E. W. Anderson,
Attorney

UNITED STATES PATENT OFFICE.

SOLOMON KAUFFMAN, OF UNION GROVE, ILLINOIS.

WAGON-BRAKE.

SPECIFICATION forming part of Letters Patent No. 408,015, dated July 30, 1889.

Application filed April 29, 1889. Serial No. 309,057. (No model.)

*To all whom it may concern:*

Be it known that I, SOLOMON KAUFFMAN, a citizen of the United States, and a resident of Union Grove township, in the county of Whiteside and State of Illinois, have invented certain new and useful Improvements in Wagon-Brakes; and I do declare the following to be a full, clear, and exact description of the invention, such as will enable others skilled in the art to which it appertains to make and use the same, reference being had to the accompanying drawings and to letters or figures of reference marked thereon, which form a part of this specification.

Figure 1 of the drawings is a vertical longitudinal section. Fig. 2 is a bottom view.

This invention relates to improvements in wagon-brakes; and it consists of the combination of parts and their novel construction, as will appear from the following description and accompanying illustrations:

In carrying out my invention I employ a brake-bar A, which is supported so as to slide in clips or keepers $a$ $a$, applied to the under side of the rear portions of the front hounds. This brake-bar carries at its ends metallic shoes or arms $a'$ $a'$, which are adapted to have frictional contact with the periphery of the front wheels of the wagon or vehicle. This brake-bar is connected by rods $b$ $b$ or chains to the serially-perforated pendent arm $B'$ of a bail-lever B, hung or pivoted upon the axle-bar $c$, as shown or otherwise. This lever is adjustably connected by a rod C to the lower serially-perforated arm of a right-angled lever D, hung in a suitable manner at its angle in a socket $d$, secured to the upper side of the tongue or pole E, said lower arm depending through an elongated slot $e$. This arm has also connected to it one end of a spring $f$, which is suitably secured at its opposite end upon the under side of the tongue or pole E, the effect of which is to automatically take off the brake when pressure is removed from the operating-lever or it is unlocked. The outer normally-horizontal arm of the lever D is connected by a rod or chain $g$ to a ratchet-bar or slide-lever F, suitably adapted for convenient manipulation, having a hand-hole at its upper end. The slide lever or bar F is disposed in a slotted plate G, secured upon the front of the vehicle body or box $h$, its teeth or notches engaging with the lower edge of the aperture of the plate, whereby it is adapted to be locked in place in applying the brake. In case the brake is used upon a hay-wagon a chain or rope is connected to said lever or bar and extended up to the driver in his elongated position upon the hay or load.

In order to prevent the tongue from rising in going downhill, a stop may be provided on the hounds, as indicated at V.

Having described this invention, what I claim, and desire to secure by Letters Patent, is—

1. The wagon or vehicle brake having the sliding brake-bar provided with shoes or blocks, in combination with the suspended bail-lever, the right-angled lever having rod or chain connection with said bail-lever, and the ratchet or notched hand-lever, substantially as set forth.

2. The wagon or vehicle brake having the sliding brake-bar provided with shoes or blocks, in combination with the bail-lever, the right-angled lever having adjustable rod or chain connection with the bail-lever, the hand-ratchet or notched slide-lever having rod or chain connection with said right-angled lever, and the spring to effect the automatic release of the brakes, substantially as specified.

In testimony whereof I affix my signature in presence of two witnesses.

SOLOMON KAUFFMAN.

Witnesses:
ROBERT WALLACE,
JOHN H. SNYDER.